Patented June 30, 1942

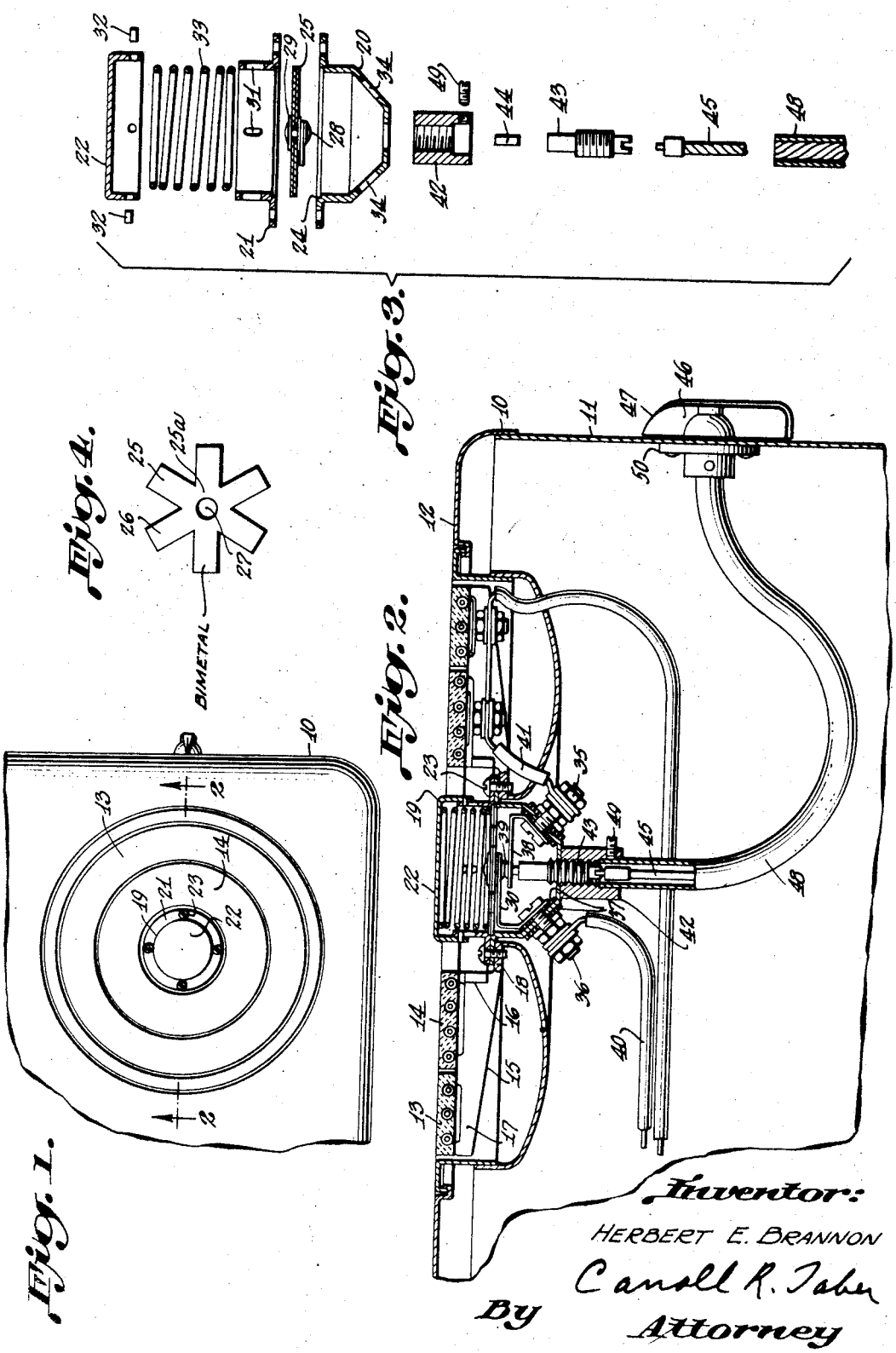

2,288,510

UNITED STATES PATENT OFFICE 2,288,510

TEMPERATURE CONTROL

Herbert E. Brannon, Detroit, Mich.

Application May 11, 1940, Serial No. 334,501

3 Claims. (Cl. 219—37)

This invention relates to controls for surface heating elements of electric ranges, and more particularly to thermostatic temperature controls for such heating elements adapted to be actuated by the heat radiated from a cooking vessel placed on the heating element.

The principal object of the invention is to provide an adjustable thermostatic temperature control for a surface heating element of electric ranges. Another object is to provide such a temperature control which is responsive to the temperature of a cooking vessel placed on the heating element. Still another object is to provide an adjustable temperature control for a surface heating element which may be easily adjusted from a control panel located at a point remote from the heating element. A further object is to provide a thermostatic control having a housing of which a part is automatically movable so as always to be in contact with a wall of a cooking vessel placed on the heating element.

In its basic aspects the invention comprises an adjustable thermostatic control switch located within a housing mounted centrally of the heating element. The housing is provided with a movable top part, or cap, which is biased upwardly by a spring so that it is always maintained in contact with the bottom of a cooking vessel placed on the heating element. Being in direct contact with the cooking vessel the cap is maintained at the temperature of the cooking vessel. Consequently, the thermostatic switch within the housing is subject to the temperature of the cooking vessel and only indirectly under the influence of the heating element itself. A flexible shaft provides for remote control of the switch adjustment.

The objects above enumerated will more fully appear in the following specification when read in connection with the accompanying drawing, wherein—

Figure 1 is a fragmentary plan view of a portion of the top of an electric range having a surface heating element mounted therein;

Figure 2 is a fragmentary cross-sectional view taken on substantially the line 2—2 of Figure 1;

Figure 3 is a cross-sectional view of the temperature control device showing the parts in disassembled relationship; and Figure 4 is a plan view of the laminated temperature responsive element employed with the temperature control.

Referring now more specifically to the drawing, Figures 1 and 2 illustrate a portion of an electric range 10 having a surface heating element to which the invention is applied. The range 10 is conventional and comprises a top 12 and a front panel 11, a portion of which serves as a control panel. The top 12 has a circular opening therein which receives the heating element. The heating element consists of a pair of heating coils 13 and 14 mounted on a spider 15. The spider 15 consists of a central ring 16 and a plurality of arms 17 radiating outwardly therefrom. Extending inwardly from the ring 16 is a support 18 upon which is mounted a thermostatic temperature control unit 19.

The thermostatic control switch unit 19 comprises a housing which is made up of three parts, namely, a bottom part 20, a central part 21, and a cap 22. The parts 20 and 21 are circular in plan and of the cross-section shown in Figures 2 and 3. Both parts are provided with peripheral flanges which are secured together and to the support 18 of the spider 15 by a plurality of screws 23. Both of the parts 21 and 22 are provided with matching rabbets 24 for the reception of a laminated temperature responsive element 25.

The element 25 is shown in plan in Figure 4. It is made up of two sheets of metal having dissimilar coefficients of thermal expansion, and comprises a central portion 25a and a plurality of radial arms 26. The ends of the arms are located in the groove formed by the rabbets 24 and are mounted loosely therein so that the laminated element may flex under the influence of temperature changes. In the center of the laminated element 25 is an opening 27 which receives a contact 28. The contact is insulated from the laminated element 25 by washers 29 of mica or similar insulating material. The contact 28 has attached to it a metallic connecting strip 30 for a purpose which will appear presently.

The central part 21 of the housing is provided with a plurality of vertically elongated slots 31 which receive a like number of pins 32 rigidly attached to and projecting radially inwardly from the side wall of the cap 22. The cap 22 fits loosely over the central part 21 and by virtue of the pin and slot connection between them a limited amount of relative vertical movement of the two parts 21 and 22 is permitted. Mounted within the interior of the parts 21 and 22 is a coiled spring 33. The coiled spring engages the top wall of the cap 22 and rests upon the ends of the arms 26 of the laminated element 25. The spring 33 is under stress and tends to force the cap 22 in an upward direction.

A pair of terminal screws 35 and 36 are mounted in openings 34 in opposite sides of the bottom part of the housing. The screws 35 and 36 are insulated from the housing by means of mica washers 37 and are connected by suitable electric cables 40 and 41 into the heating element circuit.

The connecting strip 30 previously mentioned, which extends from the contact 28, is secured to the terminal screw 36. Attached to the other screw 35 in a similar manner is a resilient metallic strip 38. This strip is preferably laminated in order to increase its flexibility. At its free end it carries a contact 39 which is adapted to touch the contact 28 on the laminated element 25. The flexible strip 38 is shaped so that when secured in place it tends to spring away from the contact 28.

Rigidly secured to the lower end of the bottom part 20 of the housing is an internally threaded bushing 42. This bushing receives a threaded adjusting screw 43. The screw 43 has a recess in its upper end which receives a short rod of insulating material 44. The rod 44 is adapted to bear against the under side of the free end of the flexible strip 38. The other end of the screw 43 is slotted to receive a corresponding projection on one end of a flexible shaft 45. The other end of the flexible shaft extends through the front wall 11 of the range and has rigidly attached thereto a knob 46. The knob 46 incorporates a pointer 47 which cooperates with a dial (not shown) to indicate the setting of the temperature control. Surrounding the flexible shaft 45 is a rigid shroud 48 which is secured at one end by a set screw 49 to the bushing 42 and at its other end to a flanged collar 50 attached to the inside of the wall 11. The shroud 48 is provided to prevent twisting and warping of the flexible shaft 45.

As will be evident from Figure 2, the temperature control operates as a switch which is connected in series with the heating elements 13 and 14.

The temperature control switch unit 19 operates to automatically maintain the desired temperature of the cooking vessel by opening the heating circuit when the temperature of the vessel exceeds a predetermined limit and again closing the circuit when the temperature falls below that limit. The circuit is opened and closed by the flexing of the laminated element 25 which moves the contact 28 away from or into contact with the contact 39.

The element 25 is in heat exchanging relation to the cap 22 and responds to the temperature thereof, bowing upwardly as the temperature increases and flattening or bowing downwardly as the temperature decreases. This flexing of the member 25 is permitted by the loose mounting of the ends of the arms 23 in the rabbets 24.

The element 25 cannot flex in a downward direction beyond the point where the contact 28 touches the contact 39. Therefore, by rotating the adjusting screw 43 and thereby moving it up or down the position of the contact 39 can be varied and the temperature at which the circuit will be broken can be regulated. Rotation of the adjusting screw 43 is, of course, effected by turning the knob 46 and the flexible shaft 45.

Since the pin and slot connection between the central part 21 and the cap 22 of the switch housing permit the cap 22 to move up and down, and the spring 33 always urges the cap 22 upward, the latter will always contact the bottom of a cooking vessel thereon, be it flat bottomed or concave. Thus, the temperature of the cap 22 will be to all practical purposes the same as that of the cooking vessel. Consequently, the movement of the laminated temperature responsive element 25 will be directly controlled by the temperature of the cooking vessel. It is not appreciably affected by the heating elements 13 and 14 directly because it is shielded by the side walls of the housing.

Thus, it will be seen that this invention provides a convenient and practical thermostatic control for electric range surface heating elements. It is of compact construction and economical to manufacture. Furthermore, it directly controls the temperature of the cooking vessel, thereby providing very accurate regulation of the heat supplied to the latter.

The scope of the invention is indicated in the appended claims.

I claim:

1. In an electric range comprising a surface heating element having a central opening therein, a unitary thermostatic temperature control for said heating element mounted in said opening, said temperature control comprising a housing having a lower tubular portion fixedly connected to said range and an upper portion telescopically engaging said lower portion for limited vertical movement relative thereto, a spring in said housing tending to separate said portions, a laminated temperature responsive element mounted in said housing in heat exchanging relation to said upper portion and adapted to flex under the influence of variations in the temperature thereof, a contact on said laminated element movable therewith, a second contact mounted on said housing for movement relative thereto and to said first contact, and screw threaded means in a wall of said housing for adjusting the position of said second contact, said temperature control being adapted to be mounted as a complete unit in the opening in said surface heating element.

2. In an electric range comprising a surface heating element having a central opening therein, a unitary thermostatic temperature control for said heating element mounted in said opening, said temperature control comprising a housing having a lower portion fixedly connected to said range and an upper portion connected to said lower portion for limited vertical movement relative thereto, a spring in said housing tending to separate said portions, a laminated temperature responsive element mounted in said housing in heat exchanging relation to said upper portion and adapted to flex under the influence of variations in the temperature thereof, a contact on said laminated element movable therewith, a second contact mounted on said housing for movement relative thereto and to said first contact, screw threaded means in a wall of said housing for adjusting the position of said second contact, said temperature control being adapted to be mounted as a complete unit in the opening in said surface heating element, and mechanism connected to said adjusting means for operating the latter from a point remote therefrom.

3. In an electric range comprising a surface heating element having a central opening therein, a unitary thermostatic temperature control for said heating element mounted in said opening, said temperature control comprising a housing having a lower portion fixedly connected to said range and an upper portion connected to said lower portion for limited vertical movement relative thereto, a spring in said housing tending to separate said portions, a laminated temperature responsive element mounted in said housing in heat exchanging relation to said upper portion and adapted to flex under the influence of variations in the temperature thereof, a contact on said laminated element movable therewith, a second contact mounted on said housing for movement relative thereto and to said first contact, a pair of terminals mounted on a wall of said housing and connected respectively to said contacts, and screw threaded means in a wall of said housing for adjusting the position of said second contact, said temperature control being adapted to be mounted as a complete unit in the opening in said surface heating element.

HERBERT E. BRANNON.